United States Patent [19]

Billingsley et al.

[11] Patent Number: 4,524,385
[45] Date of Patent: Jun. 18, 1985

[54] PREDETECTION PROCESSING OF OPTICAL INFORMATION

[75] Inventors: James D. Billingsley; Fergus E. Moore, both of Arlington, Tex.

[73] Assignee: LTV Aerospace and Defense Company, Dallas, Tex.

[21] Appl. No.: 528,222

[22] Filed: Aug. 31, 1983

Related U.S. Application Data

[63] Continuation-in-part of Ser. No. 279,171, Jun. 30, 1981, abandoned.

[51] Int. Cl.³ .............................................. H04N 1/18
[52] U.S. Cl. ..................... 358/113; 250/330; 250/332; 250/334; 250/338; 250/356; 250/363; 358/231; 364/514; 364/525; 382/41; 382/65
[58] Field of Search ................ 358/113, 231; 364/514, 364/525; 382/41–44, 65–66; 350/356, 363; 250/330, 332, 334, 338

[56] References Cited

U.S. PATENT DOCUMENTS

| | | | |
|---|---|---|---|
| 3,245,313 | 4/1966 | Zaromb | 350/363 |
| 3,678,196 | 7/1972 | Roth | 358/231 |
| 3,715,619 | 2/1973 | Cotter | 358/231 |
| 3,882,454 | 5/1975 | Marie | 382/65 |
| 3,909,112 | 9/1975 | Matsumura | 382/65 |
| 3,992,629 | 11/1976 | Chapman | 250/338 |
| 4,283,113 | 8/1981 | Eden | 350/96.15 |
| 4,314,761 | 2/1982 | Reymond | 350/356 |
| 4,470,151 | 9/1984 | Billingsley | 382/44 |

FOREIGN PATENT DOCUMENTS 1444517  8/1976  United Kingdom ................ 358/113

Primary Examiner—Howard W. Britton
Attorney, Agent, or Firm—Stephen S. Sadacca; James M. Cate

[57] ABSTRACT

An optical processing system for processing infrared information prior to detection. In one embodiment, optical information from an infrared scene is focused by optics (10) onto a thermoptic modulator (12) which contains an optical structure (16) disposed on the faceplace of a cathode ray tube. The modulator is normally nonreflective of infrared energy from the scene incident thereon. Reflecting spots (22) written on the modulator by an electron beam reflect a portion of the scene to a detector (52) which generates a signal representative of the radiance of the scene element sampled. A series of first and second reflecting spots of different size are written at selected coordinates on the modulator. The respective signals generated by the detector for each spot of the pair are subtracted to provide a spatial band pass filtered signal for each sampling coordinate on the modulator. Scanning of an entire array of sampling locations provides spatially filtered scene information in which relatively high and low spatial frequency components have been eliminated, thereby improving the contrast between an object in the scene and the background.

52 Claims, 16 Drawing Figures

ISOPTOPIC
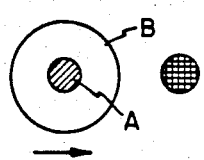
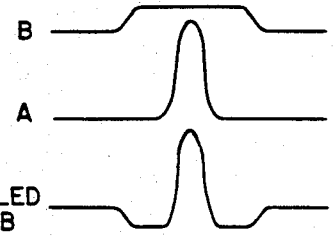
ANISOPTROPIC
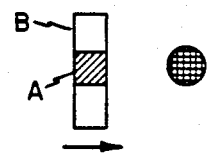
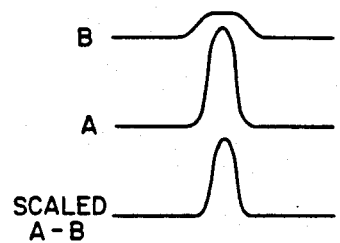
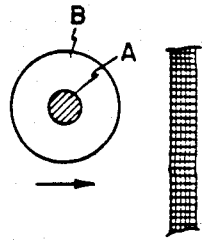
LINE FEATURE
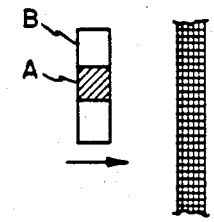
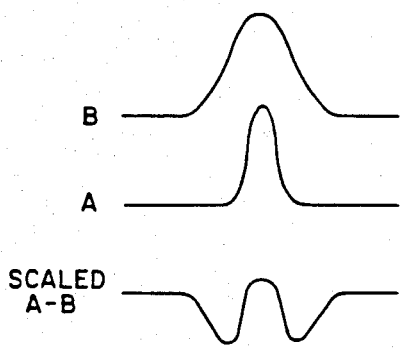
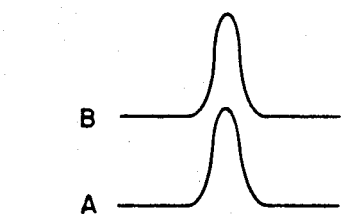
FIG. 4A
FIG. 4B

PREDETECTION PROCESSING OF OPTICAL INFORMATION

RELATED APPLICATION

This application is a continuation-in-part of U.S. application Ser. No. 279,171 filed June 30, 1981 and entitled "Predetection Processing of Optical Information and now abandoned."

TECHNICAL FIELD

The invention pertains to methods and apparatus for processing optical information, and more particularly pertains to methods and apparatus for processing optical information from infrared scenes prior to detection.

BACKGROUND ART

There is a continuing need for agile visible and infrared sensors which can suppress background clutter, randomly access any part of the total field of view, vary the instantaneous field of view, vary the magnification of the scene and perform tracking functions on multiple objects in a cluttered scene.

Vehicles which employ infrared sensors offer superior day/night and all weather capability. Unfortunately, the contrast of natural infrared scenes is relatively poor. Conventional methods for processing infrared scene information require a large number of scene samples and extensive data processing of the sampled information. There is, therefore, a need for methods and apparatus for preprocessing optical data to improve the performance of sensors.

DISCLOSURE OF THE INVENTION

In accordance with one aspect of the present invention, an optical data processor for processing optical information from a scene is disclosed. A thermoptic modulator is positioned in the image plane of the sensor. The modulator contains an optical structure which is substantially nonreflecting of optical energy, but capable of having reflecting spots written at selected coordinates thereon for reflecting optical energy incident at the reflecting spots. An electron beam is provided for writing reflecting spots at selected coordinates on the modulator. A microprocessor controls the electron beam by causing a series of reflecting spots to be written at selected coordinates on the modulator. The microprocessor controls the size and shape of the reflecting spots and switches the electron beam on and off to permit any part of the viewable scene to be accessed. A detector, positioned to view the modulator, detects optical energy reflected from the modulator. The detector provides an output signal representing the radiance of the scene element reflected from the modulator. The instantaneous field of view of the scene and the resolution may be varied by controlling the spot size. Spots may be written sufficiently close together to define one or more windows for viewing the scene, which windows are movable on the modulator over time. The spot size and location of the spot on the modulator may be continuously varied to maintain constant resolution of the scene despite relative motion between the sensor and the scene. By writing smaller spots closer together, the scene element may be electronically magnified.

In accordance with yet another aspect of the present invention, an optical data processor for processing optical information from a scene is disclosed. A thermoptic modulator is positioned in the image plane of the sensor. The modulator contains an optical structure which is substantially nonreflecting of optical energy, but capable of having reflective spots written at selected coordinates thereon for reflecting optical energy incident at the reflecting spots. An electron beam is provided for selectively writing reflecting spots at coordinates on the modulator. The electron beam writes a first spot of predetermined size at selected coordinates on the modulator. It subsequently writes a second spot, larger than the first spot, at the same coordinates. A microprocessor controls the electron beam causing a reflecting spot to be written at selected coordinates on the modulator. The microprocessor controls the size and shape of the reflecting spot and turns the electron beam on and off. A detector, positioned to view the modulator, detects optical energy reflected from the modulator. The detector provides first and second output signals representing the radiance of the scene element reflected from the first and second spots on the modulator. A signal processor is provided for subtracting the second output signal from the first output signal to obtain a spatially filtered signal.

In accordance with yet another aspect of the present invention, a method for processing infrared optical information is disclosed. A series of reflecting spots of predetermined size are successively written at selected coordinates on a thermoptic modulator. Successive scene elements are then reflected from the reflecting spots to a detector positioned to view the modulator. The radiance values of successive scene elements are detected by a detector which generates a series of output signals representing the radiance of the scene elements detected. A series of reflective spots for a chosen resolution may be written at selected coordinates on the modulator to view every scene element making up the scene in the total field of view of the sensor. Selected coordinates on the modulator may then be rescanned by writing additional reflecting spots at regions of interest with the spots being smaller than the spots in the original scan and with the sampling coordinates in the region being closer together than in the original scan to produce higher resolution.

In accordance with yet another aspect of the present invention, a method for processing optical information to reduce background clutter is disclosed. A first reflective spot of predetermined size is written at selected coordinates on a modulator. A signal representing the radiance of the infrared energy reflected from the first reflecting spot written on the modulator is generated. A second reflective spot having the same coordinates as the first reflecting spot is written on the modulator with a second reflecting spot being larger than the first spot. The second signal representing the radiance of the infrared energy reflected from the second spot is generated by the detector. The second signal is then subtracted from the first signal to obtain a spatially filtered signal. Portions of the signal below a predetermined threshold may be clipped off and the resulting signal displayed on a video display at coordinates corresponding to coordinates in the scene. The sampling spots may be symmetric or asymmetric to provide isotropic or anisotropic filtering. Filtered signals obtained at different times may be subtracted to detect motion in the scene or changes in the radiance at a scene coordinate.

DESCRIPTION OF THE DRAWINGS

For a more complete understanding of the present invention and for other advantages thereof, reference is now made to the following description, taken in conjunction with the accompanying drawings in which:

FIGS. 4A and 4B are schematics representation of the sample geometry employed in isotropic and anisotropic spatial filtering and the general characteristics of the signals obtained thereby;

FIGS. 6a, 6b, 6c, 6d, 6e, 6f, 6g, 6h, 6i and 6j are computer flow diagrams illustrating operation of the microprocessor of the present optical processing system.

DETAILED DESCRIPTION

Figure 1:
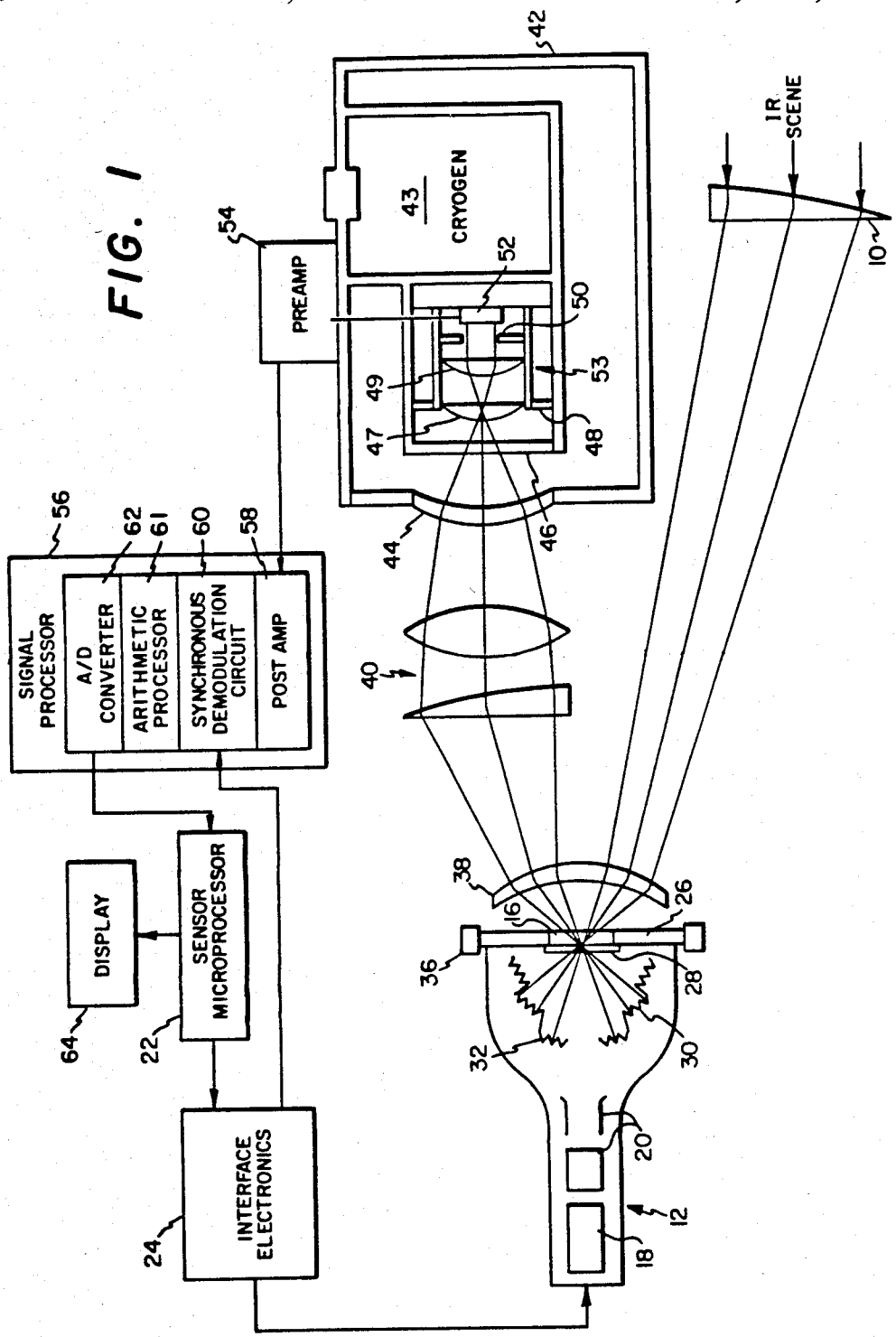
FIG. 1 is a schematic representation of the optical processing system of the present invention.

The emerging technology of thermoptic materials has introduced a variety of new light control devices, such as high speed thermoptic modulators. These devices have general application to optical data processing and particular application in predetection processing of scene information in infrared or even visible band sensors. With these new thermoptic modulators, optical sensors can randomly access or scan any segment of the viewable scene, electronically vary the instantaneous field of view (IFOV) of the sensor, change the resolution by magnification or minification of the scene element being viewed or enhance the contrast between objects in the scene relative to the surrounding background. Other techniques may be used in conjunction with the optical processor disclosed herein for stabilizing scene images in a computer reference frame while the sensor is moving relative to the scene.

The optical processing techniques described herein are based on the use of thermoptic materials which permit localized modulation of infrared (or visible) information incident at the image plane of a sensor or telescope to permit selected fields of view of the scene to be defined, excluding unwanted scene information and unwanted background flux on the detector. The physical phenomenon on which the thermoptic modulator technology is based is the sudden change in optical properties of certain materials at specific phase transition temperatures. In thermoptic materials such as, for example, thin films of the transition metal oxides, the change in crystal structure from the semiconductor to metal states is thermodynamically favored above the phase transition temperature. A sudden change in phase results in a sudden change in optical properties to produce the change from a nonreflecting to a reflecting state. Switching times between states can be extremely short, on the order of nanoseconds. When properly designed, such thin films in the semiconductor state (below the transition temperature) are highly nonreflecting of energy at wavelengths in the infrared and even in the visible. When an area of the film or when the entire film is switched to its reflective state (above the phase transition temperature), this area of the film stack is highly reflective to infrared energy.

The thermoptic properties of various transition metal oxides have been studied and reported in the literature. Measurement of infrared reflectance and transmission of thin films of vanadium oxides has yielded excellent contrast ratios, particularly in thicknesses from 0.05 to 0.5 microns. These ratios have provided a base to allow the computer-aided design of an infrared thermoptic modulator containing vanadium dioxide thin films to produce specified performance characteristics in the 3–5 micron band and the 8–12 micron band. A typical application of a vanadium oxide thin film is as the faceplate of a conventional cathode ray tube. This arrangement is called an infrared thermoptic modulator. By controlled scanning of these films with an electron beam, localized areas on the films can be made highly reflective to relay elements of the image of an infrared scene to an off-axis detector. This eliminates the conventional mechanical scanning technique and provides rapid random access to any element of the scene image. Vanadium dioxide is a suitable material for both visible and infrared wavelength modulators. It is probably the most desirable transition metal oxide for most applications because the transition temperature of vanadium dioxide thin films is about 67° C., not too far above room temperature.

Another oxide of vanadium, $V_2O_3$, exhibits the same type of phase transition as $VO_2$ but at a lower temperature, $-123°$ C. The DC electrical properties of the low and high temperature phases of $V_2O_3$ are similar to those of $VO_2$ with an even larger ratio of resistivity observed at the phase transition. From available data, it appears that the properties of $V_2O_3$ also make it a suitable material for applications in the infrared band. The transition energy of $V_2O_3$ is about the same as that of $VO_2$. This energy can be supplied with conventional cathode ray tube electron guns or lasers. The $-123°$ C. transition temperature of $V_2O_3$ is compatible with a low background infrared sensor system. The optical properties of $V_2O_3$ at wavelengths in this band are such that high reflectance and nonreflectance contrasts can be achieved with relatively simple film structures.

A film stack or modulator containing a thin film of $VO_2$ or $V_2O_3$ and thin films of other infrared transparent materials such as germanium, silicon, sapphire, magnesium fluoride or calcium fluoride can be designed to provide high reflectance/nonreflectance ratio at any given wavelength in the infrared and at usable ratios in the visible band. The choice between $VO_2$ or $V_2O_3$ thin films is dictated primarily by ambient temperature considerations. At temperatures below 67° C., $VO_2$ films can be maintained in the nonreflecting state, whereas $V_2O_3$ must be held at temperatures below $-123°$ C., which usually requires cryogenic cooling.

The proper control of the electron beam in a thermoptic modulator tube or other heating apparatus, such as, for example, a laser beam, permits reflecting spots of any size and location to be written on the normally nonreflecting modulator so that any portion of the infrared scene of interest may be viewed while excluding unwanted infrared radiation. By the proper control of the ambient temperature, reflecting spots written on the modulator can be maintained indefinitely or allowed to decay at times as rapidly as 0.3 microseconds. In the thermoptic modulator, spot sizes as low as 20 microns have been obtained. In film stacks in which laser beam switching has been employed, switching times as short as 35 nanoseconds have been observed with spot sizes as small as 5 microns. Clearly, these infrared thermoptic modulators are extremely rapid and provide precision control of the field of view. For further information about the optical properties of vanadium oxide thin films, reference is made to U.S. Pat. No. 4,283,113 entitled "Optical Modulation of Vanadium Oxide Thin Films".

Broadly speaking, the optical processing of the present invention is made possible by electronically programming a thermoptic modulator located at the image plane of the telescope objective ahead of the detector such that the optical path of the detector is selectively coupled with the optical path of the telescope by the reflecting spots written on the modulator. This arrangement allows only energy intercepted by this spot on the modulator to be reflected to the detector. In infrared applications, various other components such as cold stops, cold filters, retroreflecting mirrors, cold absorbers and cryostats are employed in the detector optical cavity to reduce extraneous infrared background radiation from the modulator and other components from reaching the detector. This arrangement is called a dark field telescope because until a reflective spot has been written on the modulator, the scene is not optically coupled to the detector and the detector sees only a dark field.

Although modulators which operate in the visible as well as in other bands can be constructed, optical processing in the infrared is of great interest in the context of sensors employed in vehicle systems.

FIG. 1 illustrates the dark field telescope and optical processor of the present invention. Infrared radiation from a scene incident on a section of a conventional telescope objective lens 10 is focused onto a thermoptic modulator 12 disposed at the image plane of the telescope. Modulator 12 is a conventional cathode ray tube with an optical structure 16 disposed at the faceplate. The cathode ray tube contains an electrostatic focus gun 18 and electrostatic deflection plates 20 or alternatively, electromagnetic focus and/or deflection coils. The electron beam is synchronously switched on and off under the control of the sensor microprocessor 22, which sends appropriate signals to interface electronics 24 where digital signals are converted to analog signals and used with conventional table lookup electronics to provide control signals to electrostatic focus gun 18 and deflection plates 20. Alternatively, a scanable laser may be employed in place of an electron beam.

Optical structure 16 comprises a suitable optical substrate 26 and film stack 28 disposed on substrate 26, the materials for the substrate 26 and films in stack 28 being chosen to optimize the nonreflecting/reflecting characteristics at a particular wavelength of interest. Film stack 28 contains at least one vanadium dioxide thin film. Where infrared emission from the faceplate becomes the limiting noise feature of the system, $V_2O_3$ thin films may be employed along with a cryogenic cooling apparatus. By appropriate choice of materials and thicknesses, low thermal emission can be obtained.

A retroreflecting mirror 30 is provided behind the film stack to autocollimate the detector cavity. Mirror 30 may take one of several forms such as an array of small corner cubes (FIG. 1), a curved mirror, or a lens-mirror combination. Retroreflecting mirror 30 causes the field of view of the detector to fold back on itself to form an optical cavity with the detector at one end and the retroreflecting mirror at the other. The field of view of the cavity is restricted by the cryogenically cooled elements to form a low background flux or "dark field" optical cavity. The thermoptic modulator is located in the cavity but since it has low reflectance in its normal state, infrared radiation focused on the modulator is not coupled into the low background flux detector cavity. The modulator is oriented such that when it is switched to its reflecting state, the infrared energy from the telescope is directed into the cavity field of view and onto the detector. In this condition, the optical components of the telescope are aligned with the coupled field of view of the detector. These optical components are also warm, but have very low emissivities and therefore do not contribute significantly to the detector's background flux. The optical component mounts are outside the cold stopped field of view and therefore do not contribute to the background flux on the detector. Infrared radiation from the scene that is within the cold stopped field of view can enter the telescope and reach the detector when the modulator is "on" (reflective), but cannot when the modulator is "off" (nonreflective). The modulator can therefore be used to control the infrared energy from the scene that reaches the low background (dark field) flux cavity of the detector. An alternate form of the low background flux cavity is achieved by replacing the retroreflecting mirror with a low reflectance (black) cryogenically cooled stop. Infrared radiation from the stop is low because of its low temperature even though its emissivity is high and since bodies that have high emissivities have low reflectance, infrared radiation from other sources are not reflected into the low background flux cavity of the detector.

The telescope cavity may also be autocollimated by providing a similar retroreflecting mirror 32 of absorber behind the modulator such that unwanted scene information which is not completely absorbed and passed through the modulator is reflected back through the objective lens 10.

As shown in FIG. 1, temperature control devices 36, such as thermoelectric junctions or resistance wire, are provided adjacent the modulator faceplate to maintain a temperature of approximately 50° C., which is approximately 15° below the transition temperature of the vanadium dioxide thin film. This permits reflecting spots written on the modulator by electron beam heating to decay rapidly as the heated region returns to ambient temperature.

To facilitate collection of scene radiation reflected from modulator 12, a lens 38 is provided. Infrared energy reflected from the modulator is passed through lens 38 through additional low emissivity (warm) optical elements 40 to a dewar vessel 42 which houses the detectors. Dewar vessel 42 contains a cryogen 43 of liquid nitrogen or other suitable cryogenic liquid. A (warm) window 44 is provided to vessel 42 through which optical elements 40 focus infrared energy into the dewar to a spectral filter 46. A field lens 47 is supported by a cold field stop 48. Spectral filter 46 is a conventional optical filter designed to pass the optical band of interest. Field stop 48 limits the total field of view of the detector cavity and excludes other sources of infrared energy. Within the dewar vessel 42, additional cold lenses 49 are provided to focus the infrared energy onto a cold pupil stop 50 which further limits the energy incident on the detector.

Detector 52 is employed behind the cold pupil stop 50 to detect the radiant flux of that portion of the infrared scene reflected by the modulator. Detector 52 is cryostatically maintained at low temperature (on the order of −196° C.). Conventional infrared detectors such as indium antimonide detectors may be employed, or other detectors such as lead selenide or mercury cadmium telluride may also be used depending upon the wavelength at which the telescope is to operate. The assembly 53 composed of field lens 47, lens 49, pupil stop (50) and detector (52) may be subdivided into an array of smaller subassemblies to improve sensitivity and/or improve speed by making parallel output channels. Subdividing field lens 47 into an array of joined smaller lenses will cause each of the smaller lenses to act as a field stop which segments the telescope's field of view. An array of assemblies will then make each segment of the field of view independent of the others. The smaller assemblies provide higher optical gain and reduced noise. Multiple preamplifier modules 54 may be connected in parallel to detectors 52 or a single preamplifier may be multiplexed between the detectors. Since the FOV at each subassembly is independent of the others, the modulator can simultaneously provide an independent reflective spot for each of the subfields.

Images of the cold field stop and cold pupil stop are relayed through the optical system so that they lie inside the boundaries of the low emissivity optical components. Infrared emission from the supporting optical structure is thus prevented from impinging on the detectors. Infrared radiation from the scene which is within the field of view is prevented from reaching the detectors by designing the modulator to be nonreflecting in its normal state. All sources of background radiation are thus minimized to produce the desired dark field condition. Infrared radiation from a selected element of the scene is allowed to reach the detectors by writing a reflecting spot on the modulator with the electron beam.

The output signal of preamp module 54 is fed to a signal processor 56 which contains a postamplifier 58, a synchronous demodulation and temporal filter circuit 60, an arithmetic processor 61, described below in greater detail and circuitry 62 for converting the output of the demodulation circuit and/or arithmetic processor 60 to digital form for subsequent processing by sensor microprocessor 22.

Elements of the infrared scene of interest can be selectively scanned by writing a series of reflecting spots of selected size at selected coordinates on the modulator. By synchronously switching the electron beam on and off under the control of sensor microprocessor 22, thereby modulating the radiation from the scene to produce the signal, background noise can be sampled when the field is dark and the background signal can be subtracted to reduce noise from the detectors and preamp module. The resulting signal in which background noise effects have been minimized is converted to digital form and fed to the sensor microprocessor where it is processed for display, if desired, at video display 64. For additional details concerning the dark field telescope which are not part of the present invention, reference is made to the copending application of James D. Billingsley and Dayton D. Eden, Ser. No. 279,151, filed June 30, 1981 and entitled "Dark Field Infrared Telescope."

When information from the real world scene is desired, a localized spot of predetermined size and geometry is written at the desired coordinates on the modulator. The optical path of the detector is thereby coupled with the optical path of the telescope by the reflecting spots, allowing energy intercepted by the spot on the modulator to be reflected to the detector. The spot size determines the instantaneous field of view (IFOV) of the sensor and therefore the area of the scene to be sampled, which defines resolution. The coordinates of the reflective spot on the modulator determines the location of the scene element to be sampled. By varying the location of the spot on the modulator, a movable IFOV is created whereby a portion of the viewable scene can be viewed to the exclusion of the rest of the scene in the total field of view. The size of the IFOV is determined by the size of the spot, which can also be commanded. The smaller the spot size, the greater the resolution. The shape of the IFOV is determined by the geometry of the spot, which is likewise programmed. By properly programming the modulator, any part of the telescope viewable scene can be randomly accessed with any degree of resolution within the limits of the programmable spot size and shape and the optical resolution limits of the infrared sensor. Free format scene sampling thus allows a group of spots to define a field of view with variable size, shape and location. This is simply achieved by programming the desired scale, start addresses, end addresses and window set sequence. These features permit multiple independently movable fields of view for target tracking. Tracking and scanning can occur simultaneously. Electronic magnification (increased resolution) can be achieved by reducing spot size and spacing.

The ability to program the modulator means that image processing is no longer tied to a fixed format data stream. The sensor can thus be programmed to acquire information from the scene in formats optimized to the immediate function performed. Whereas many conventional sensors are limited to a raster scan of a scene with fixed IFOV for each pixel, the present invention permits raster scan with any size IFOV, or random access to any part of the scene, depending upon the needs of the sensor. Random scan patterns can in fact be superior to raster scans by reducing spatially correlated noise. By making the entire modulator reflective, the sensor can view the entire scene; by making any part of the modulator reflective, any desired scene element is viewable. Instead of a fixed raster scan at a specific resolution, the present invention has the ability to scan a scene at one level of resolution (IFOV and spacing) by writing a series of reflective spots of one size, and then addressing only particular elements of the scene which appear to be of interest at a higher resolution (smaller IFOV and smaller spacing).

The sensor can also be programmed to correct for image distortion and blurring caused by the translational and rotational motion of the sensor relative to the scene. The spot or sampling pattern can be moved and distorted on the modulator to follow the image motion and its distortion. For example, a stationary, isometric coordinate system in the scene can be tracked as a moving, nonorthogonal, anamorphic coordinate system in the image of the scene on the modulator. The information needed to control this type of electronic scene stabilization and distortion correction can be obtained from the scene itself. For further information about the six parameter sampling control algorithm that performs this function, reference is made to the copending application of James D. Billingsley, Donald T. Cottingham and Thomas G. Newman, Ser. No. 295,925, filed Aug. 24, 1981 and entitled, "Image Motion and Distortion Stabilization for Predetection Scene Information Processing Sensors," now U.S. Pat. No. 4,470,151.

The present invention permits spatial filtering of the scene to enhance the contrast between objects of interest and the surrounding background by obtaining a high and low resolution sample from the scene and subtracting one from the other to obtain a filtered, "uncluttered" signal.

Figure 2:
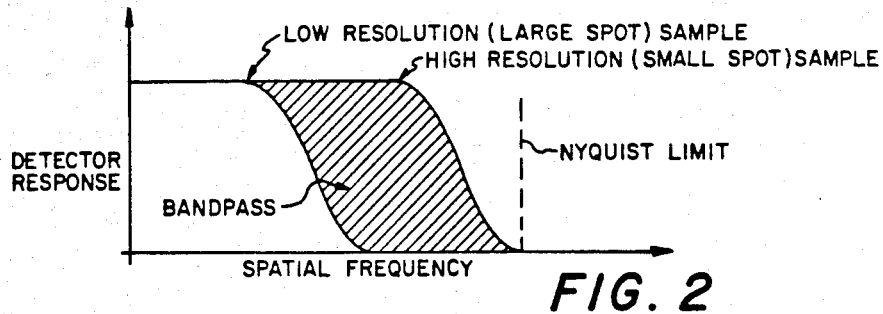
FIG. 2 is a graphical representation of the detector response as a function of the spatial frequency.
Figure 3:
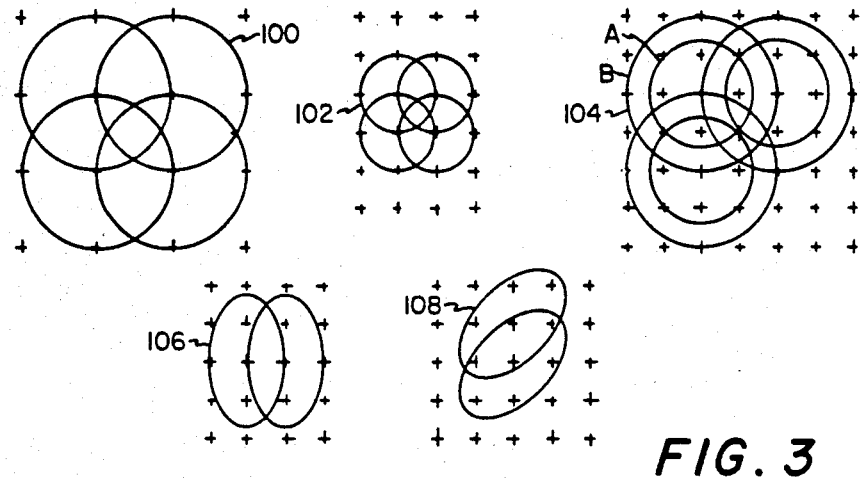
FIG. 3 is a schematic representation of a variety of sampling spots and their relative sizes, shapes and sample spacing.

FIG. 2 graphically illustrates detector response as a function of spatial frequency for a high and low resolution sample set. As shown in FIG. 2, the maximum spatial frequency information that can be obtained from the scene is limited primarily by the spacing between samples and secondarily by the size of the sample area. The term "spatial frequency" refers to the spatial distribution of observed radiance values in the same manner that temporal frequency refers to the time distribution of observed signal values. The spatial frequency represents the variations in intensity as a function of distance on the focal plane. The infrared background scene that the sensor must observe and extract information from is composed of materials having emissivity and temperature variations that are spatially distributed to produce radiance contrast patterns. These patterns contain information necessary for distinguishing between natural and specific features for navigation and commercial and military targeting operations. The maximum spatial frequency which can be sampled decreases with increased spacing between samples. As the sample area is increased, more high frequency roll off occurs as shown in FIG. 2. A wide range of two-dimensional low pass spatial filters can therefore be programmed by appropriate selection of sample area and sample spacing. FIG. 3 illustrates a variety of sampling spots and their relative sizes, shapes and sample spacing.

A low pass spatially filtered scene is achieved by writing a spatially separated set of spots on the modulator as shown by the numeral 100 in FIG. 3. The spatial variations of the scene image within the reflecting spots (high frequencies) are averaged by the detector and accordingly high spatial frequency information is reduced, leaving low spatial frequency information. The sample spots of one low pass spatial filter are shown at 100. A higher roll off low pass spatial filter is achieved by using relatively smaller spot sizes and spacing, as shown at 102, to produce filtered signals having different frequency roll off characteristics.

Band pass spatial filtering is possible for frequencies in the shaded region in FIG. 2 by subtracting signals with lower frequency roll off from the signal with higher frequency roll off. Typical sample spots, which might be used in band pass filtering, are shown at 104. By sampling the scene twice at the same location by programming different spot sizes on the modulator as shown by A and B at 104, one of the sampled signals can be subtracted from the other to obtain a resulting signal in which certain higher and lower spatial frequencies are minimized. In the preferred embodiment, the lower resolution signal is scaled by a predetermined normalization factor, then subtracted from the high resolution filtered signal, thereby diminishing scene clutter which has larger or smaller spatial frequencies relative to the spatial frequencies of interest.

The Nyquist frequency is represented by the vertical line in FIG. 2, which is the maximum spatial frequency that can be sampled with two samples per spatial period. Since the Nyquist frequency depends upon a separation of the samples, this limit can be moved by arbitrarily changing the sample spacing. Below the Nyquist frequency, however, the roll off characteristics are controlled by the sample area. By controlling relative sample areas of two samples taken of the same scene information, spatial frequencies of interest can be passed and higher and lower spatial frequency clutter can be eliminated. Since the optical system can produce images with high frequency content, low pass filtering by the samples require that the sample diameter should be larger than the spacing between sample centers to reduce "aliasing." A ratio of sample diameter to sample spacing between 2 and 3 will produce near optimum results. This procedure of overlapping of sampling, shown in FIG. 3 at 100 and 102, minimizes the "aliasing", in which higher spatial frequencies masquerade as low spatial frequencies.

Since an object's size determined its spatial frequency characteristics, a band pass filter can be constructed which will pass frequency characteristics of any size, or range of sizes. To determine the spatial frequency characteristics of interest and to define the boundaries of the band to be passed, spatial frequency (size) information for various classes of objects frequently encountered in a scene may be stored and retrieved by the microprocessor 22 for comparison with the scene being scanned. For example, if the sensor were employed in a tactical vehicle whose mission is to search for and destroy a bridge, the modulator would be programmed to emphasize scene features with spatial frequencies similar to a bridge, diminishing other larger and smaller scene features. Using the optimum sampling criterion mentioned above, or some other appropriate criteria, sample areas and sample spacing can be determined by the microprocessor to emphasize a particular class of features.

Scene stabilized, free format sampling using variable spatial filtering allows the sampling strategies to be optimized for particular modes of operation and adaptively optimized in real time for specific scene conditions. The information being extracted from the scene can be exploited in a hierarchy of processing functions to minimize sampling and subsequent processing of scene information.

An infrared telescope may have a requirement of minimum scene search time for a particular class of targets in a cluttered scene. The parameters that will produce a high probability of detection are selected to minimize the number of samples required to search the scene. For example, to extract the necessary scene information to separate an object from a cluttered infrared scene, using a post processor and a conventional sensor, 40,000 samples (200×200 pixels) in a conventional raster scan might be required. To obtain the same information in the present invention would require only 400 spatial filter samples (20×20 pixels), resulting in a reduction by a factor of 100 of the number of samples in a conventional scan. Moreover, as the scene is searched, the detected radiance values can be ranked for rescan according to whether they pass the filtering and/or threshold criteria. Priority ranked rescanning of a relatively small subset of the 400 samples can be performed at high resolution with improved signal to noise ratio. During rescanning, most of the false alarms created by clutter can be rejected, leaving the real targets and scene clutter that have contrast and spatial frequency characteristics similar to the target class. Higher order recognition processes can then be applied to the relatively small set of samples extracted from the scene which have been priority ranked according to the probability of correlation with the target characteristics.

These can be further scanned at even higher resolutions. A variety of sample sizes, patterns and shapes corresponding to various image enhancement operators may be used by appropriate programming of reflecting spots on the modulator.

Isotropic low pass spatial filtering is illustrated at 100 and 102 in FIG. 3. Isotropic filtering has general application to predetection image processing in which spatial frequency distributions in any direction is of interest. Typically, this will include the initial scan of the scene made by the modulator to identify potential candidates for rescan at higher resolution. In FIG. 3, at 104, and in FIG. 4a, which illustrate isotropic band pass filtering, the circle labeled A represents the sample area of the high resolution sample and the circle B, the sample area of the low resolution sample. The detector signal response is indicated schematically by the signals B and A. Signals A and B are fed to signal processor 56 where the low resolution signal B is scaled and subtracted from the high resolution signal A to provide a band pass filtered signal S, where $S = A - kB$, were k is some predetermined scaling factor. Signal S is then converted to digital information by A to D converter 62 and processed by the main program of microprocessor 22. If desired, signal S can be displayed by conventional video display 64 (FIG. 1) at coordinates which correspond to coordinates in the scene.

As shown in FIG. 3, at patterns 106 and 108, sample spots may be asymmetrical in any direction. The ability to program asymmetric spots in any direction permits anisotropic filtering. FIG. 4b illustrates the concept of anisotropic spatial filtering. Anisotropic filtering may be employed when it is desired to emphasize spatial frequency information in one particular direction and to suppress spatial frequency information in other directions. Anisotropic filtering might be used, for example, to search for a land vehicle traveling along a road. In such a case, it would be desirable to diminish the image of the road while enhancing the image of the vehicle. Anisotropic filtering along the direction of the road would therefore be different from filtering in a direction perpendicular to the road. However, if the road is also being used for navigation, it might be desirable to emphasize the image of the road as well. In general, both isotropic and anisotropic filtering may be required simultaneously. As seen in FIG. 4b, the high resolution sampling spot B is extended in the vertical direction, while the low resolution sample spot A is essentially a square. Although FIG. 4b illustrates vertical anisotropy, it is understood that by making the low resolution sampling spot asymmetrical with respect to the high resolution spot, anisotropic filtering can be achieved in any direction. Thus, horizontal anisotropic filtering can be achieved by extending the high resolution sampling area horizontally, rather than vertically, or in any other direction. Moreover, the sample area geometry is not limited to squares and rectangles as shown in FIG. 4b, but can employ ellipses, circles or other geometric configurations. The general shape of signals A, B and S obtained by anisotropic filtering are shown in FIG. 4b.

Another processing function permits subtraction of sets of samples of the same size and spacing taken at different times to detect changes between subsequent sets of radiance data. These changes can result from changes in the radiance of a scene element or the motion of an object in the scene. The samples processed may be low pass, band pass filtered or other spatially filtered scene samples.

Once the target or desired object has been located, electronic magnification can be employed to maximize resolution inside the boundaries of a located object to examine its smaller details. By reducing the size of the spots written on the modulator and by writing these spots closer together, the averaging effect over the sample area is decreased, making the radiance values within the smaller area more nearly representative of smaller features in the scene. Magnification is feasible because the area of interest requiring detailed analysis has been sequentially reduced in an orderly process to a very small fraction of the total field of view.

Another predetection function which is possible is the ability to take into account perspective resolution differences and continuously changing resolutions resulting from the motion of the telescope relative to the scene. The IFOV is determined by the size of the reflective spot on the modulator and the effective focal length of the telescope. The IFOV and slant range then determine the ground resolution. By continuously programming information available from the autopilot about the attitude and elevation of the sensor, the sampling resolution can be continuously tailored to desired dimensions in object space. Using the relation $$S_m = \frac{S_g fl}{R},$$

where $S_m$ is the spot size on the modulator, $S_g$ is the desired spot size on the ground, fl, the focal length, and R, the range, the modulator spot size and spacing can be computed for all points of the modulator. Range data can be computed from attitude and elevation data obtained from the autopilot. For example, in a sensor employed in the terminal homing phase, the size of the image increases quite rapidly. With appropriate programming of the modulator, constant object space resolution can be maintained, if desired, over any part of the flight path.

Figure 5:
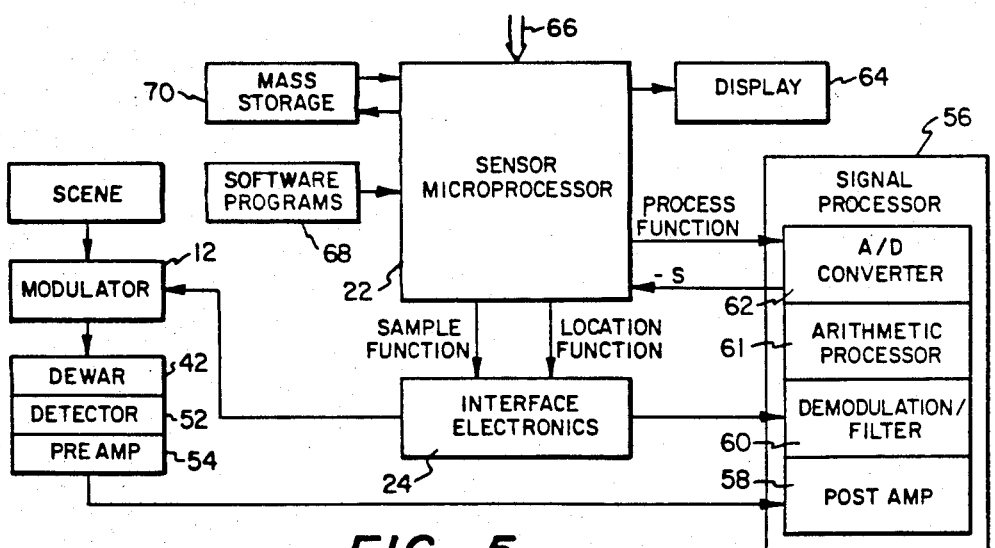
FIG. 5 is a functional diagram of the optical processing system of FIG. 1.

Reference is now made to FIG. 5, which is a functional diagram of the optical processing system shown in FIG. 1. The sensor microprocessor 22, which is the central processing unit of the optical processing system, directs the various image processing operations previously described. It determines the coordinates, size, geometry and dwell time of the reflecting spots to be written on the modulator; it controls the processing of signals by the signal processor 56; and it provides postdetection processing of signal information from the detector. Microprocessor 22 executes a sequence of commands from the operator via an external communication channel 66, such as by typewriter keyboard or radio telemetry, or alternatively, executes instructions from software 68 stored in the system.

Three major functions are required in the execution of a scan by microprocesor 22. These are the LOCATION function, specifying the scanned area, the SAMPLE function, specifying the subfunctions to be performed in sampling a single scene element, and the PROCESS function, specifying the arithmetic operations to be performed on the signal received from that location.

Search parameters are furnished to the microprocessor 22 directly by the operator via channel 66 or from storage 70. These parameters are used to determine the sample size and spacing to divide the total field of view into an array of sampling positions, each from which both high and low resolution samples can be taken. For an airborne tactical weapon, for example, a stored software routine can be loaded into the microprocessor 22 and stored information about the size (spatial frequency) characteristics of the object under investigation may be processed to determine the size, spacing and shape of the sample spots required to pass a band of spatial frequencies appropriate for the object of investigation given the particular circumstances. This information is used to obtain the LOCATION function parameters. Alternatively, these parameters could be supplied directly to the microprocessor 22 via channel 66 by the operator.

The LOCATION function parameters include integer numbers which specify the actual sample positions to be scanned in the array of all possible sample positions. In an initial scan, for example, this may include the entire array of sample positions. In a subsequent rescan, this would normally include only the relatively small number of locations which have a high probability of providing the information of interest. This information is provided to the interface electronics 34 which generates an appropriate analog signal for the electrostatic deflection plates 20 which control the location of the reflecting spot.

When a given location has been selected for scanning, various SAMPLE functions are executed by microprocessor 22 acting via interface electronics 24 to poduce appropriate analog signals to implement the instructions on modulator 14. The SAMPLE functions are an open ended list of subfunctions performed for each sample specified by the LOCATION function. The subfunctions determine the action taken (event) and the time interval between events. Typical SAMPLE subfunctions would include, for example, writing a reflecting spot of predetermined size and shape at specified modulator coordinates, holding the reflecting spot for a predetermined length of time, sampling from the infrared detector, storing the sampled signal and moving to the next spot. As these commands are processed, digital information which is to be translated into voltages for controlling the electron beam are provided to interface electronics 24. Electronics 24 responds to this digital information by providing separate signals indicative of (1) the X, Y coordinates of the sample, (2) the size and shape of the sample and (3) the dwell time. The digital information about the coordinates, spot size and shape can be converted into analog signals by a lookup procedure in which an appropriate analog signal is generated in response to particular bits of digital information. The resulting control signals fed to modulator 12 produce the desired reflecting spots on the modulator.

As previously described, a high resolution sample may be made at a sample location by writing a relatively small spot at that location on the modulator. The infrared information incident on the spot is reflected to the detector 52 which provides an output signal A indicative of the observed thermal flux. The signal is amplified by preamp 54 prior to being fed to the signal processor 56 where it may be stored for comparison with a low resolution sample taken from the same sample location. A low resolution sample is next taken at the same sample location by writing a relatively larger size spot on the modulator centered at the same location. The output signal B is then received by the analog signal processor 56. The PROCESS functions involve the preprocessing of acquired sample data for further processing or for use in display. Under the direction of microprocessor 22, the low resolution signal B is scaled by some predetermined factor, then subtracted from the high resolution signal A at arithmetic processor 61. This processing is done in real time, during the course of the scanning process. The PROCESS functions include the scaling of one of the signals relative to the other, subtracting two signals to implement band pass filtering and adding a bias constant for applications in which the signal is to be displayed. A resulting signal S is then sent to microprocessor 22 after being converted to digital form via an analog to digital converter 62. Microprocessor 22 may direct digitized information to be stored in storage 70 until the scanning is complete. After storing signal S, the next sample location may be addressed and the entire scanning process repeated until the entire sample array or any subset thereof has been scanned. At this time, the stored information may be displayed or further processed by the microprocessor depending upon the particular application. Further processing might include, for example, comparison with stored reference maps and generation of a correlation surface, comparisons with stored reference maps to determine a position fix and to implementation of a change in heading or implementation of other image enhancement features.

Figure 6A:
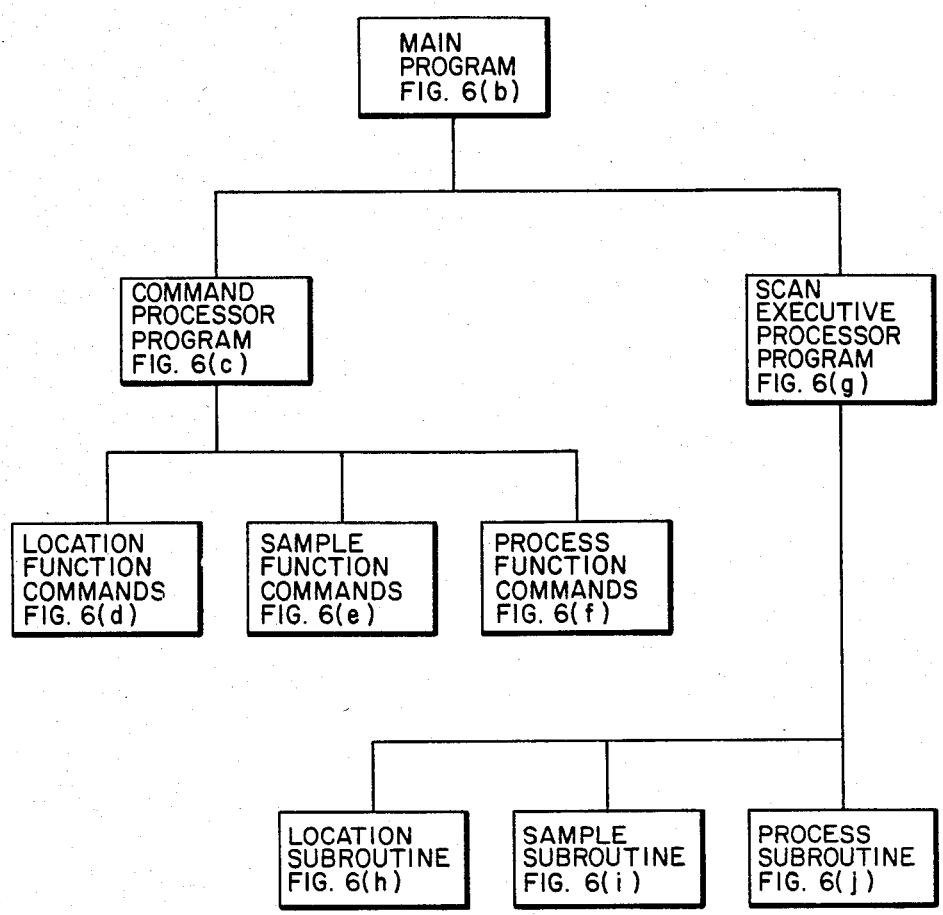
Figure 6B:
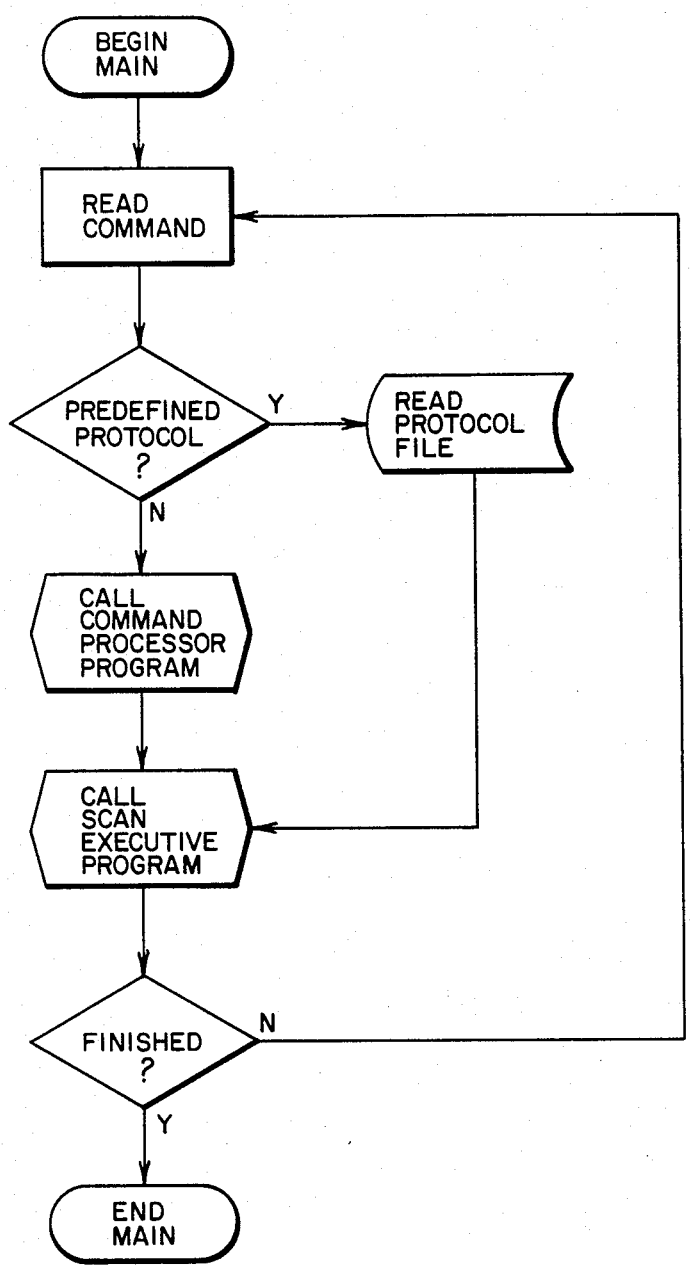
Figure 6C:
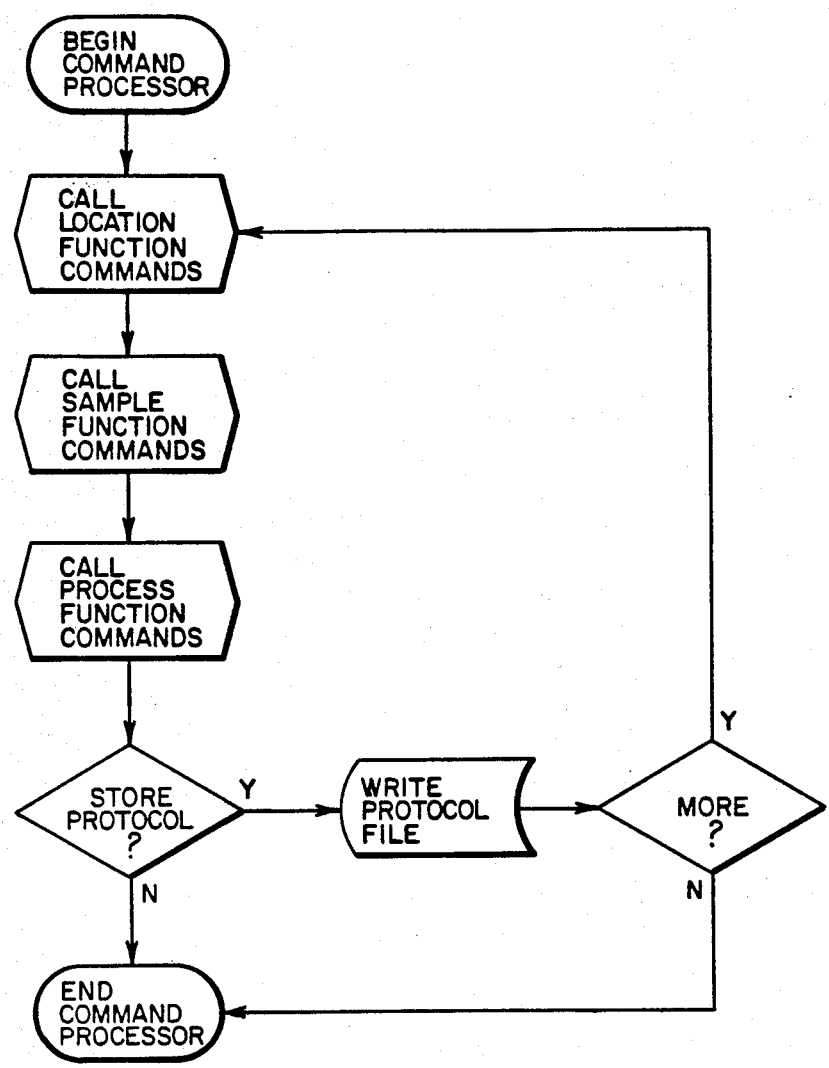
Figure 6D:
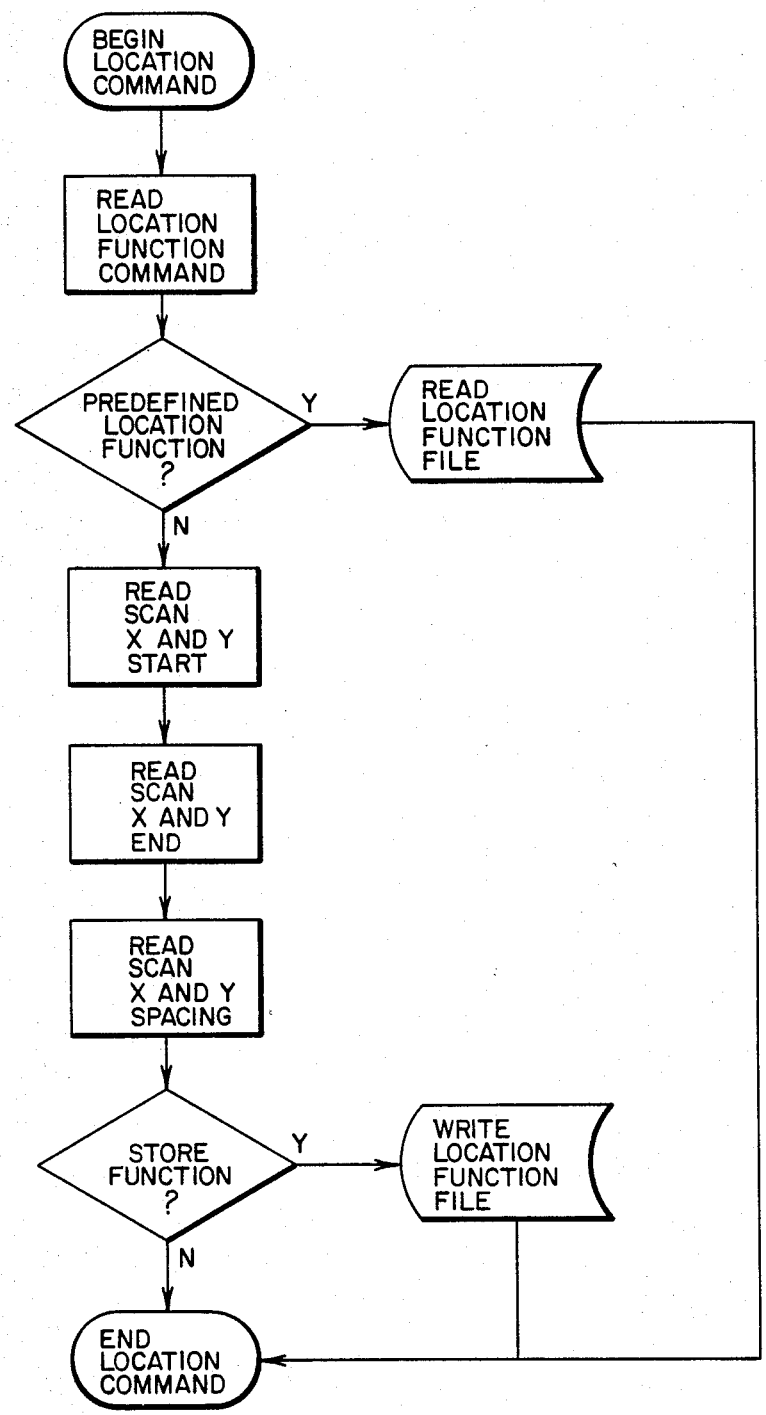
Figure 6E:
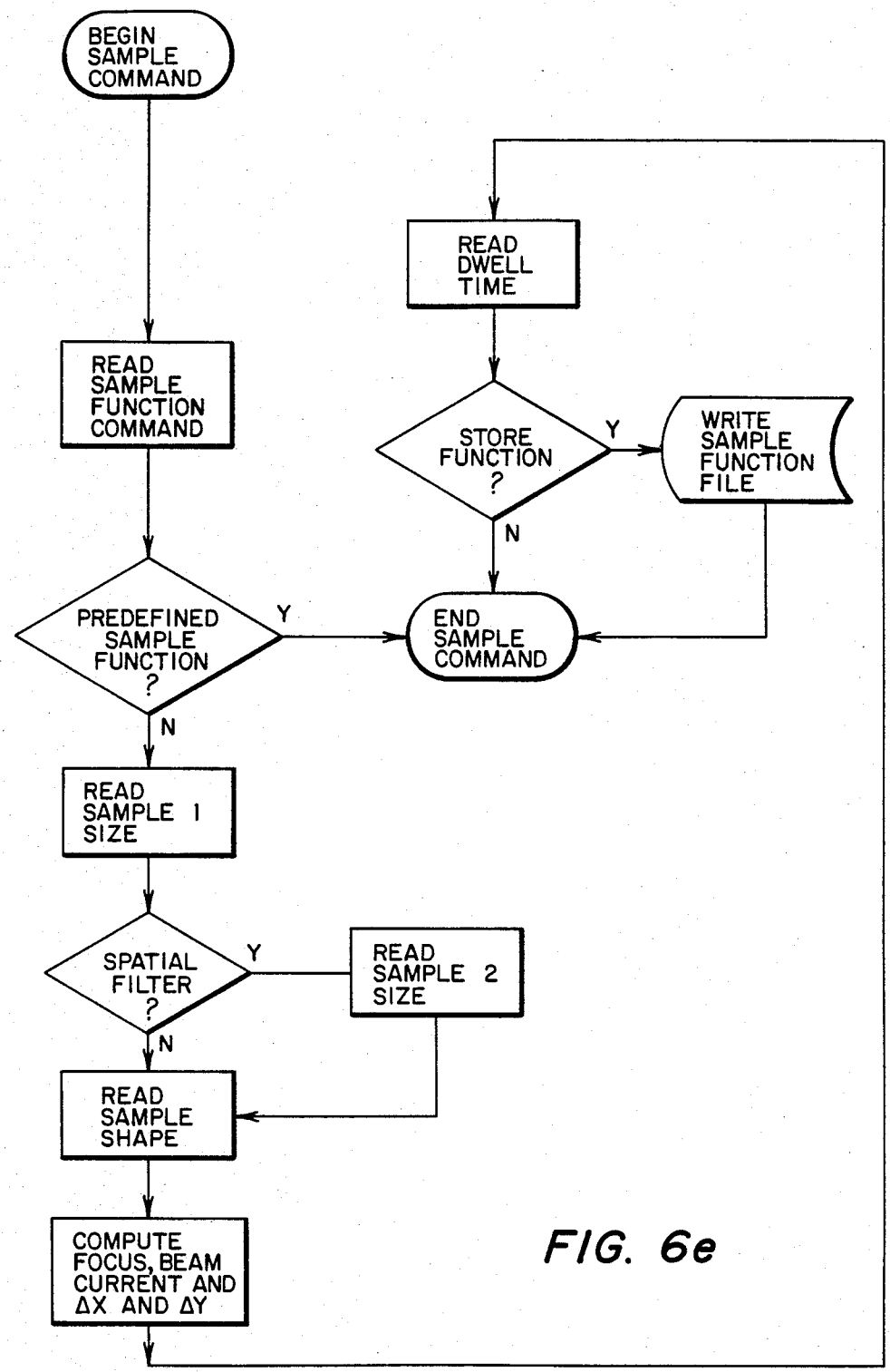
Figure 6F:
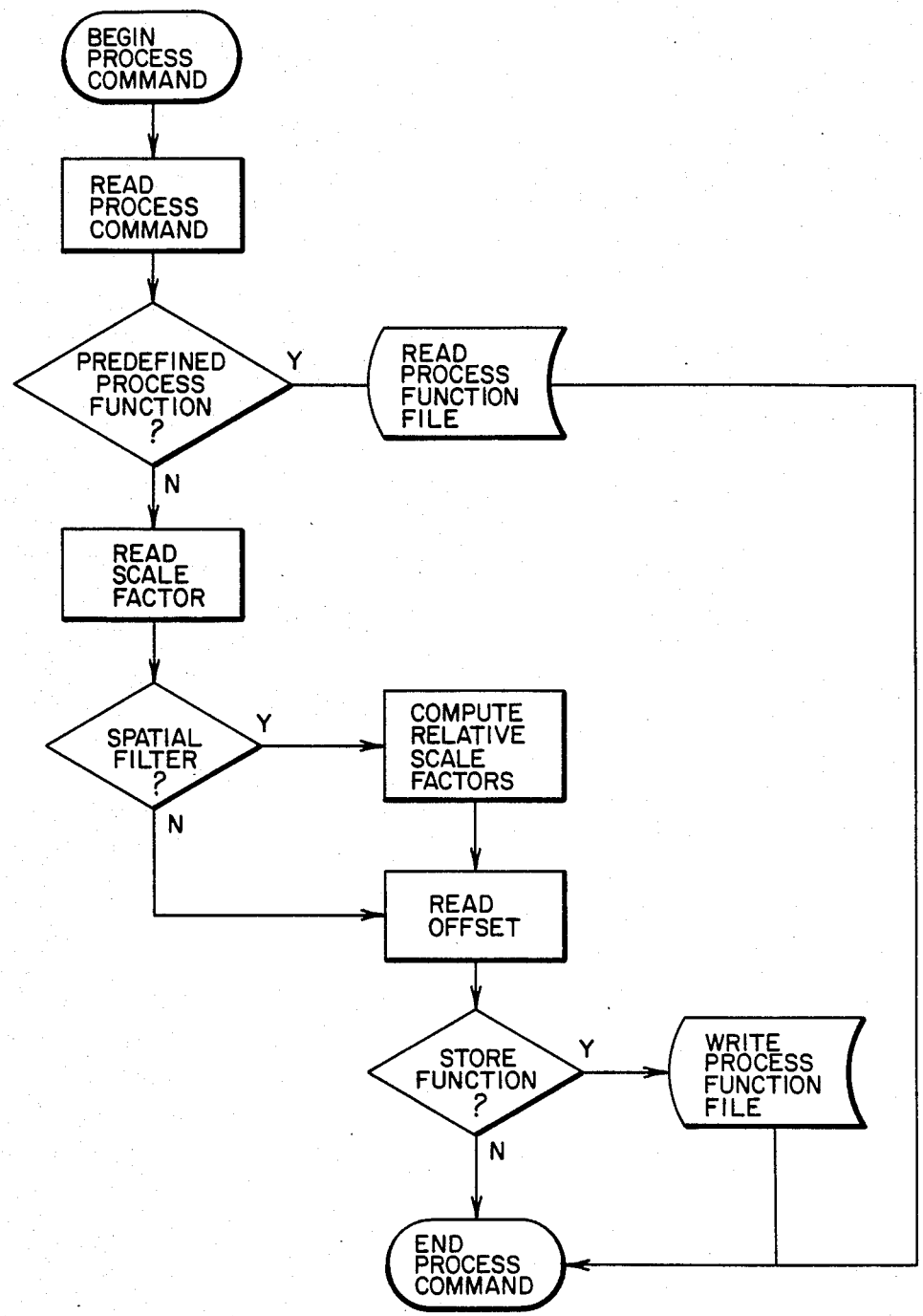
Figure 6G:
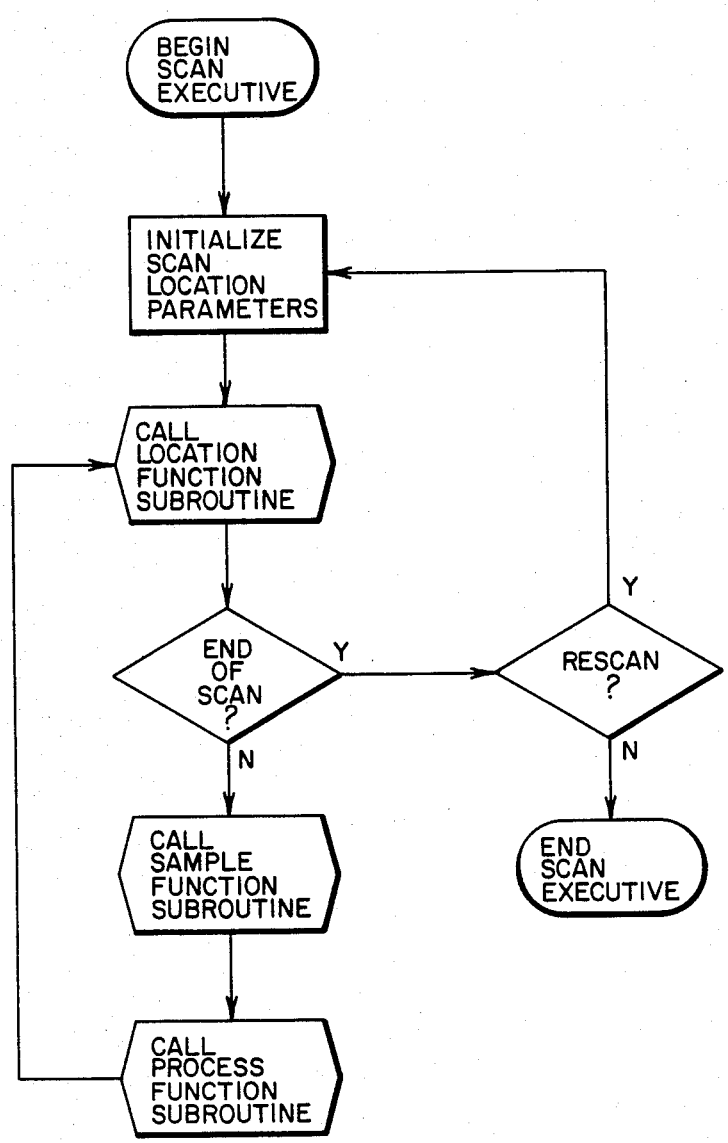
Figure 6H:
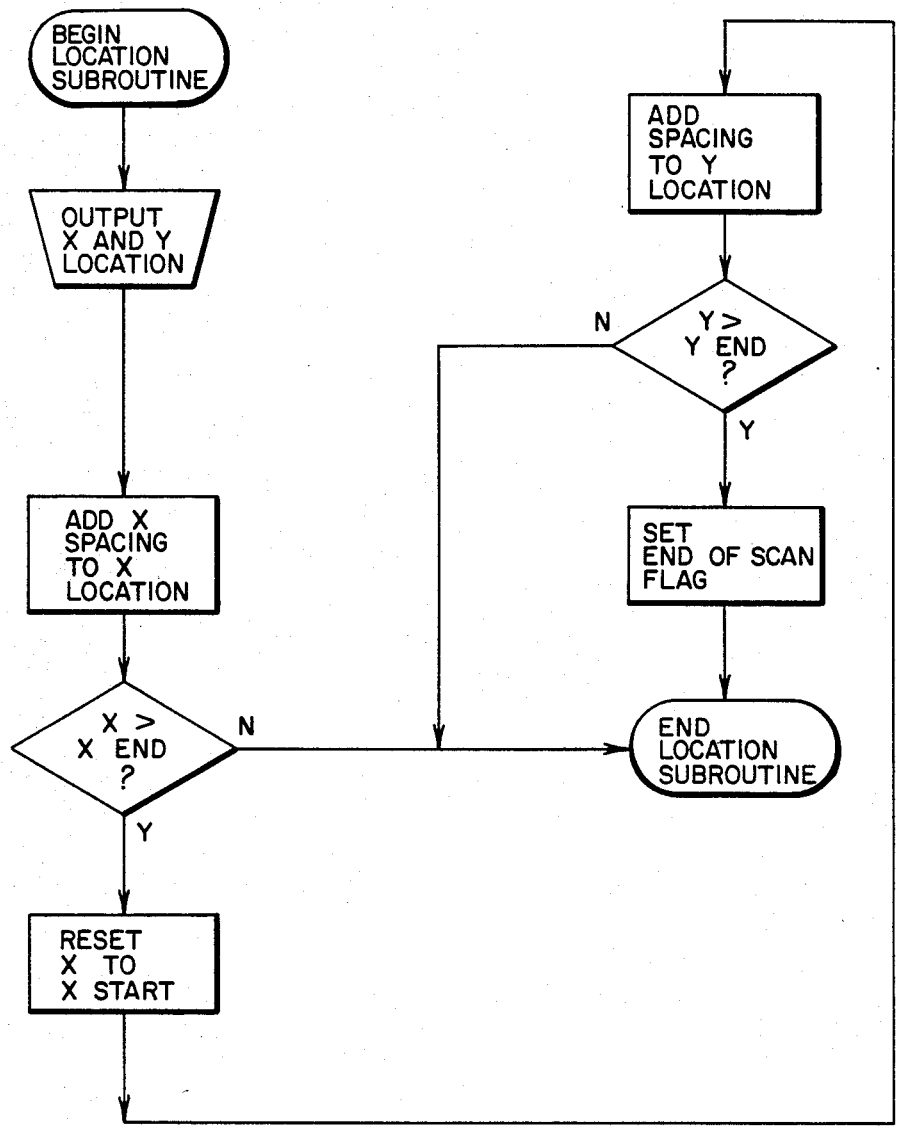
Figure 61:
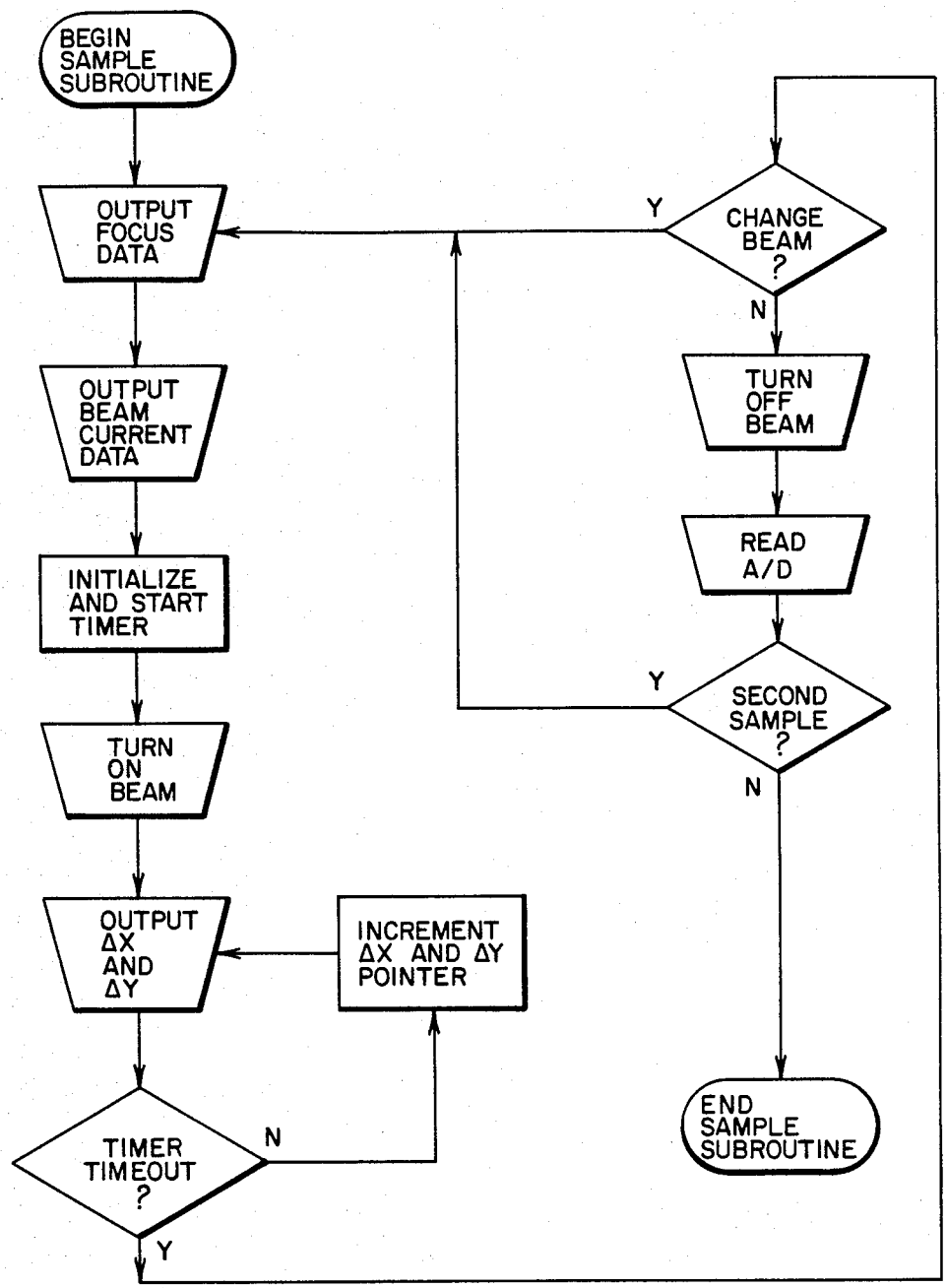
Figure 6J:
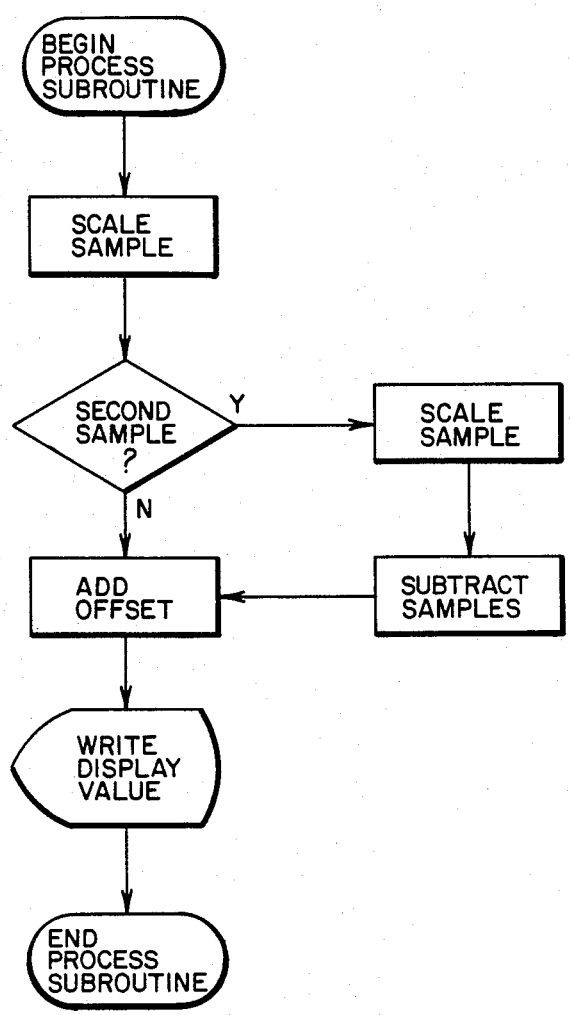

Referring now to FIGS. 6a–6j a more detailed explanation of the operation of sensor microprocessor 22 and the software programs 68 (FIG. 5) will be discussed. Referring initially to FIG. 6a which is an expansion of the microprocessor software programs 68, display 64 and mass storage 70 of FIG. 5a block diagram flowchart for software programs 68 which drive the sensor microprocessor 22, display 64 and the mass storage 70 is shown. The main program to be described with reference to FIG. 6b consists of two sections. The first section (FIG. 6c) processes the commands from the operator or sets up the desired functions through a higher level mission processor. The second section of the main program (FIG. 6g) is a scan executive processor which actually does the scanning. The three functions that are set up within the command processor program are the location function (FIG. 6d), the sample function (FIG. 6e) and the process function (FIG. 6f). Similarly in the scan executive processor section the same three subroutines are set up, location (FIG. 6h), sample (FIG. 6i) and process (FIG. 6j).

Referring now to FIG. 6b, the main control program which controls all the subprograms that follow is illustrated. The main program begins and reads a command from the operator and decides whether the function is a predefined function or not. If the command is a predefined function, the program will read that predefined function from a protocol file indicated to the right of the decision block. If the command is not a predefined function the program will call the command processor program. After executing the command processor program which is illustrated in FIG. 6c the program will execute the scan executive program which flowchart is illustrated in FIG. 6g. If a predefined function was present the program will go directly to the scan executive program skipping the command processor program. If the scan is completely finished, the main program will end. If the scan is not finished the program will return to the read operator command.

Referring now to FIG. 6c, a flowchart of the command processor, the first subprogram that the main program (FIG. 6b) calls, is illustrated. The command processor is begun by first asking the operator for location function commands. The location function command is another subprogram to be discussed with reference to FIG. 6d. After the location function commands are entered, a call is made to the sample function commands in which the operator enters desired functions for the sample. The sample function subprogram is further detailed in FIG. 6e. After exiting the sample function subprogram, the command processor program calls another subprogram which calls the process function commands (FIG. 6f).

At this point in the program, the command processor has all of the desired inputs from the operator and asks the operator if he wishes to have the protocol stored for future reference. If desired, the protocol is written to the mass storage 70 (FIG. 5). After writing to the mass storage 70 the operator is asked if there are more protocols to be written, in which case the program returns to the beginning of the command processor and calls the location and continues the process further. If it is not desired to store the protocols in the command processor and if there are no further entries, the command process program is ended.

Referring to FIG. 6d, the location function command subroutine is illustrated. A particular location function command is read. If this command is a predefined location function the location function block from the mass storage 70 (FIG. 5) is read and if the location function is stored on file and there are no further entries into the location command the subroutine will end. If there is not a predefined location function, the scan X and Y start locations and the scan X and Y end locations will be read. This data will define the upper left-hand corner and the lower right-hand corner of a rectangular scan area.

The next parameter to be read is the scan X and Y spacing. This data determines the spacing in the X direction and the Y direction of the samples that will be sampled in the region defined by the X and Y start and end locations. These sets of parameters, the X and Y start; and the X and Y end; and the X and Y spacing can be stored on a location file which is indicated as being written onto the mass storage 70. At this point the program exits. All of the locations that are to be scanned by the scan microprocessor 22 are now defined as microprocessor 22 sends its commands to the modulator interface 24 and to the modulator 12 itself.

The sample subroutine is illustrated in FIG. 6e. A sample function command is read, and if the command is a predefined command the subroutine is complete. If the command is not a predefined function, the size of sample 1 is read. If the data is to be spatially filtered the size of sample 2 is read. If spatial filtering is not used, the sample shape is read. These are the shapes, for example, eliptical, giving a major and minor axis for instance, and also an orientation of the major axis with respect to the horizontal.

These shapes are illustrated in FIG. 3 where single samples are shown at 100, smaller samples are shown at 102 and dual samples are shown at 104 which is the spacial filter. Sample 1 is the center sample, A, and sample 2 is the outer sample, B. The sample shapes in FIG. 3 are shown at 106 and 108 as eliptical although they can be circular as shown in the remaining parts of FIG. 3.

Once the sample size is read from the operator microprocessor 22 computes, using known parameters for the electron gun of the modulator tube of modulator 12, the required focus beam currents and a $\Delta X$ and $\Delta Y$ dither which is used to form the shape of the spot. $\Delta X$ and $\Delta Y$ are small movements of the electron beam used to shape the spots. These spots in general will be small Lissajous patterns traced by the electron beam around the spot location and can be used to make eliptical, or circular spots. The computation of the focus beam current, the $\Delta X$ and $\Delta Y$ are dependent on the kind of film that is used for the modulator 12 and for the kind of electron gun which is used in the modulator 12.

After computing the focus beam currents, $\Delta X$ and $\Delta Y$, a dwell time would be read from the operator. The dwell time regulates the time during which signals are accumulated from the reflective modulator. Longer times are used to obtain more sensitivity, and shorter times are used for high speed scans of lower sensitivity. Once all of these functions are read from the operator in the sample function command subroutine, they may be stored in the sample function file which is in mass storage 70. At this point, the program may be exited or the program may be completed, under operator command, without storage.

Referring now to FIG. 6f, the process command subroutine begins by reading a process command. If a predefined process function from a function file in mass storage 70 is obtained, the file is read and the subroutine is complete. Otherwise, if there is not a predefined function, a scale factor is read. The scale factor is used in the spatial filtering operation in which the smaller sample will be normalized with respect to the larger sample so that both samples reference per unit area. As illustrated in FIG. 3, the samples B and A (104) are covering two different areas and must be normalized so that the two samples can be subtracted.

If there is no spatial filtering being performed, an offset is read. The offset is an additive number which is added to the sample before the sample is displayed. This operation is to create a display which has an appropriate appearance for the operator to view. Again, the process function commands which has been entered by the operator can be stored on a write process function file. In which case the write function is performed and the subprogram is ended. At this point in the program the operator input for all of the operator inputs that are required for the modulator have been performed and the program exits from the command processor (FIG. 6c).

Upon exiting the command processor the scan will begin which is shown in FIG. 6g. The scan executive program performs the actual scanning. The program begins by initializing the scan location parameters which are the start X and Y location. The scan executive program again calls three further subroutines. The first subroutine is the location function subroutine. After calling the location function subroutine the decision is made whether the end of the scan has been reached. This is determined by whether the values of the end X and Y positions have been exceeded. If the end values have not been exceeded the sample function subroutine is called.

The sample function subroutine is the subroutine that actually performs the sampling or causes the modulator 12 to forms spots on its reflective surface and actually do the actual sampling of the scene. Once the sample function routine is finished the process function subroutine is called. The process function subroutine will numerically process the data and place the data on a display screen 64 for the operator. After the process function subroutine has been concluded the program loops back to the location function subroutine. The location function subroutine will increment the sample parameters to the next position where a sample is desired and again if the end of scan is not exceeded the sample function routine will be called again and then the process function subroutine will be called. This loop continues until the end X and end Y parameters are exceeded. The end X parameter which is usually the horizontal direction of the scan will occur before the end Y parameter. Once the end of the line is accomplished the X parameter will be reset and the Y parameter will be incremented by one. The end of the scan will be ended by exceeding both the X and Y parameters. When the scan is ended by exceeding both the X and Y parameters, the operator is asked if he wishes to rescan. Rescan is initialized at the start X and start Y again and the entire process starts again. If a rescan is not desired then the scan executive program is exited and a return is made to the main program (FIG. 6b) and operator commands would be read for further scanning. If no further scanning is required an exit would be made from the main routine (FIG. 6b).

Referring now to FIG. 6h, the location function subroutine is shown. The location function subroutine is done by outputting to the interface electronics 24 (FIG. 5) which presents to the modulator 12 the X and Y location to be sampled. The X spacing is added to the X location and if the X location exceeds the end X parameter the X parameter is reset to start. If the X location is less than X end the location subroutine is completed. At this point the modulator electron beam has been deflected to the position where a sample is desired. At this point after exiting the location subroutine the next subroutine which is the sample subroutine (FIG. 6i) is entered.

Assuming that the X location does exceed X end, the X parameter is reset X start. At this point, spacing is added to Y and a decision is made whether the Y location has exceeded Y end. If the Y location does exceed Y end, the end of scan flag is set. This indicates that a rectangular region of the image has been scanned. At this point the location subroutine is complete and the end of scan flag being set is detected by the scan executive module (FIG. 6g). If the end of the scan is detected the operator would be asked if a rescan was desired. If the Y location does not exceed the Y end then there is a valid sample point and again the location subroutine will be completed. In each case, if valid scan positions are located, the X and Y location will be transferred to the modulator which will be deflected to the X and Y location.

Upon exiting the location subroutine (FIG. 6h) the executive program (FIG. 6g) determines whether the end of scan is to be performed. If the end of scan is not to be performed the next subroutine is called which is the sample subroutine. The sample subroutine controls the sampling at the position to which the location function has deflected the modulator electron beam. Referring to FIG. 6i, the sample subroutine outputs a focus voltage and a beam current to the interface electronics 24 which in turn provide that data to the modulator electron beam of modulator 12. At this point a timer is initialized and started. This timer is the dwell time timer. Immediately after starting the timer the electron beam will be unblanked.

After the beam has been turned on, small excursions in the beam in the X and Y directions indicated by $\Delta X$ and $\Delta Y$ are performed. The spot size and shape are determined by the beam current, the focus and the $\Delta X$ and $\Delta Y$ parameters. As the spot shapes and sizes are outputted the timer is checked periodically and the if the timer has not timed out the next $\Delta X$ and $\Delta Y$ position will be incremented which will perform a small excursion near the center of the spot. This small loop of outputting the $\Delta X$ and $\Delta Y$, checking the timer and incrementing to a new $\Delta X$ and $\Delta Y$ will perform the shaping function required for the spot. If the timer has timed out the $\Delta X$ and $\Delta Y$ processes are terminated.

A decision is then made as to whether a change should be made in the beam, a new parameter for the focus, the beam current and the $\Delta X$ and $\Delta Y$. If such a change is desired the yes branch on the decision block will be taken and the changes that are required will be performed. If the beam is not to be changed, the beam will be turned off. Immediately after turning the beam off the A to D converter 62 (FIG. 5) is turned on and the sample is digitized. Upon digitizing the sample and storing that sample in the sensor microprocessor memory, a decision is made as to whether a second sample at the location is to be taken. The second sample is related to the spatial filtering if spatial filtering is desired. If the second sample is required then the beginning of the sample subroutine is executed and the process continues. If no second sample is required or if the second sample has already been performed the sample subroutine is complete. Upon exiting the sample subroutine, the process subroutine (FIG. 6j) will process the data which has just been acquired during sample routine.

Referring now to FIG 6j, the sample is scaled according to the scale factors which have been computed by the operator commands during the command phase of the program. If there is a second sample it will also be scaled and a subtraction operation which performs the spatial filtering operation is performed. The next step is to add the offset which has been determined by operator command. This offset value will offset the numbers to a desired intensity on the display screen. Once the offset has been added the data is sent to the display 64 (FIG. 5) which is displayed on the screen. This ends the process function subroutine and the flow returns to FIG. 6g to proceed to the next sample point by calling the location function subroutine which is given in FIG. 6h.

Thus, it can be seen that the optical processing system of the present invention provides a library of predetection processing functions which vastly improve the image processing capabilities of sensors.

Although the present invention has been described with respect to specific embodiments thereof, it will be understood that various changes and modifications will be suggested to one skilled in the art, and it is intended to encompass such changes and modifications as fall within the scope of the appended claims.

We claim:

1. An optical data processor for preprocessing optical information from a scene being viewed by a sensor comprising:

a thermoptic modulator positioned in the image plane of the sensor, said modulator having an optical structure disposed at the faceplate thereof, said optical structure being substantially nonreflecting of optical energy, but capable of having reflecting spots written at selected coordinates thereon for reflecting optical energy incident at said spots, said modulator including writing means capable of selectively writing spots at any location on said optical structure;

control means connected to said writing means for causing a spot to be written at selected coordinates on said modulator; and detector means positioned to view said modulator for detecting optical energy reflected from said modulator, said detector means providing an output signal representing the radiance of the scene element reflected from said modulator.

2. The optical processor of claim 1 wherein said optical structure is designed to modulate light in the visible band.

3. The optical data processor of claim 1 wherein said optical structure is designed to modulate light in the infrared band.

4. The optical data processor of claim 1 wherein said writing means is a laser beam.

5. The optical data processor of claim 1 wherein said writing means is an electron beam.

6. The optical data processor of claim 1 wherein said control means selectively controls the size of said reflecting spot written on said modulator.

7. The optical data processor of claim 1 wherein said control means selectively controls the shape of said reflecting spot written on said modulator.

8. The optical data processor of claim 1 wherein said control means selectively switches said writing means on and off.

9. The optical data processor of claim 8 wherein said optical structure is maintained at a temperature sufficient to cause reflecting spots written on said modulator to vanish when said writing means is switched off.

10. The optical data processor of claim 6 further comprising:

means connected to said control means, responsive to changes in position and attitude of said sensor, for selectively changing the size and location of said reflecting spots subsequently written on said modulator to maintain a constant resolution of said scene element being viewed despite relative motion between said sensor and the scene.

11. The optical data processor of claim 10 wherein said spot size and spacing are varied to effectively control resolution.

12. An optical processor for processing optical information from a scene being viewed by a sensor prior to detection comprising:

a thermoptic modulator positioned in the image plane of the sensor, said modulator having an optical structure disposed at the faceplate thereof, said optical structure being substantially nonreflecting of optical energy, but capable of having reflecting spots written at selected coordinates thereon for reflecting optical energy incident at said spots, said modulator including writing means capable of selectively writing reflecting spots at selected coordinates on said optical structure;

control means connected to said writing means for causing a series of reflecting spots to be written at selected coordinates on said modulator, said control means capable of selectively controlling the size and shape of each of said spots and capable of switching said writing means on and off; and detector means positioned to view said modulator for detecting optical energy reflected from said modulator, said detector means providing a series of output signals representing the radiance of the scene elements reflected from each of said reflective spots written on said modulator.

13. The optical data processor of claim 12 wherein first and second reflective spots of predetermined size are successively written at the same coordinates on said modulator, said second spot being larger than said first spot, to produce first and second output signals from said detector means representing the radiance of the scene elements reflected from each of said first and said second reflecting spots.

14. The optical data processor of claim 13 further comprising:

signal processing means connecting to said detector means for subtracting said second output signal from said first output signal to obtain a spatial band pass filtered signal.

15. The optical data processor of claim 14 further comprising:

video display means connected to said signal processing means and responsive to said filtered signal for displaying said signal at coordinates on said display corresponding to locations in the scene.

16. The optical data processor of claim 13 wherein said first and said second spots are geometrically symmetric.

17. The optical data processor of claim 13 wherein said first and said second spots are geometrically asymmetrical.

18. The optical data processor of claim 14 wherein said signal processing means includes means for scaling said second output signal prior to subtraction from said first output signal.

19. The optical data processor of claim 18 wherein selected areas of said scene are subsequently rescanned by writing relatively smaller reflecting spots at selected coordinates on said modulator.

20. The optical data processor of claim 12 wherein the entire scene in the field of view of the sensor is scanned by successively writing a series of reflecting spots on said modulator at coordinates spaced a predetermined distance apart.

21. The optical data processor of claim 20 wherein said scan is a raster scan.

22. The optical data processor of claim 20 wherein said scan is a random scan.

23. The optical data processor of claim 12 wherein said detector means includes a plurality of detector assemblies for subdividing the total field of view of the sensor into a plurality of independent subfields.

24. The optical processor of claim 23 wherein said control means causes a plurality of reflecting spots to be written on said optical structure such that different processing functions may be simultaneously employed in each of said subfields.

25. An optical data processor for preprocessing infrared information from a scene being viewed by an infrared sensor comprising:

a thermoptic modulator positioned in the image plane of the sensor, said modulator having an optical structure disposed at the faceplate thereof, said optical structure being substantially nonreflective of infrared energy, but capable of having reflecting spots written at selected coordinates thereon for reflecting infrared energy incident thereon, said modulator including writing means capable of writing reflecting spots at selected coordinates on said optical structure;

control means connected to said writing means for causing a series of reflecting spots to be written at selected coordinates on said modulator, said control means capable of controlling the size and shape of said reflecting spots and switching said writing means on and off;

detector means positioned to view said modulator for detecting infrared energy reflected therefrom, said detector means providing a series of output signals representing the radiance of the infrared scene element reflected from each of said reflecting spots written on said modulator;

signal processing means connected to said detector means for processing first and second output signals corresponding to first and second reflecting spots written at the same coordinates on said modulator, said first spot being smaller than said second spot, said processor subtracting said second spot from said first spot to obtain a band pass filtered signal; and video display means connected to said signal processing means and responsive to said filtered signal for visually displaying said filtered signal at coordinates on said display corresponding to coordinates in the scene.

26. A method for processing optical information in an optical sensor comprising the steps of:
 (a) successively writing a series of reflecting spots of predetermined size at selected coordinates on a thermoptic modulator;
 (b) reflecting successive scene elements in the total field of view of the sensor from the reflecting spots written in step (a) to a detector positioned to view said modulator;
 (c) detecting the radiance values of successive scene elements reflected from said modulator in step (b); and
 (d) generating a series of output signals representing the radiance of the scene elements detected in step (c).

27. The method of claim 26 wherein the reflecting spots in step (a) are sequentially written at selected coordinates on said modulator to view every scene element making up the scene to view the total field of view of the sensor.

28. The method of claim 26 wherein the size of said reflecting spots in step (a) are decreased and the spacing between modulator coordinates at which said spots are written is decreased to increase resolution and to produce magnification.

29. The method of claim 26 wherein some of said reflecting spots in step (a) are written at coordinates on said modulator sufficiently close together to define a window for viewing the scene.

30. The method of claim 29 wherein a plurality of windows are defined.

31. The method of claim 29 wherein a plurality of windows exist on said optical structure at the same time.

32. The method of claim 29 wherein each one of said windows moves independently of each of said other windows over time.

33. The method of claim 26 wherein at least some of said reflecting spots overlap.

34. A method for processing optical information in an optical sensor comprising the steps of:
 (a) successively writing a series of reflecting spots of predetermined size at selected coordinates on a thermoptic modulator, said coordinates being selected such that a portion of said spots are written at coordinates sufficiently close together to define at least one window for viewing the scene;
 (b) reflecting successive scene elements in the total field of view of the sensor from said reflecting spots and said windows written in step (a) to a detector positioned to view said modulator;
 (c) detecting the radiance values of successive scene elements reflected from the modulator in step (b); and
 (d) generating a series of output signals representing the radiance of the scene elements detected in step (c).

35. The method of claim 34 wherein the portion of said reflective spots defining said window are written such that said window moves around on said modulator.

36. The method of claim 34 wherein other reflecting spots are written on said modulator to simultaneously scan the scene while at least one of said windows exists on said modulator.

37. The method of claim 34 further comprising the step of:
 (e) separately processing the series of output signals generated in step (d).

38. The method of claim 37 wherein at least some of said output signals processed in step (e) are processed differently.

39. A method for processing optical information in an infrared sensor to reduce background clutter comprising the steps of:
 (a) writing a first reflecting spot of predetermined size at selected coordinates on a thermoptic modulator;
 (b) generating a signal representing the radiance of the infrared energy reflected from said first reflecting spot written on the modulator to a detector;
 (c) writing a second reflecting spot on said modulator having the same coordinates as said first reflecting spot, said second spot being larger than said first spot;
 (d) generating a second signal representing the radiance of the infrared energy reflected from said second reflecting spot to said detector; and
 (e) subtracting said second signal obtained in step (d) from said first signal obtained in step (b) to obtain a spatially filtered signal.

40. The method of claim 39 further comprising:
 (f) repeating steps (a)–(e) at different coordinates on said modulator.

41. The method of claim 40 further comprising the step of:
 (g) subtracting spatially filtered signals obtained at different times to detect motion in the scene.

42. The method of claim 40 further comprising the step of:
 (h) subtracting spatially filtered signals obtained at different times to detect changes in radiance at a given coordinate in the scene.

43. The method of claim 39 wherein at least one of said reflecting spots is asymmetrical.

44. The method of claim 39 wherein at least one of said reflecting spots is asymmetrical in a predetermined direction.

45. The method of claim 39 wherein at least one of said reflecting spots is symmetrical.

46. The method of claim 39 further comprising the step of:

(i) clipping a portion of said filtered signal below a predetermined threshold.

47. The method of claim 46 further comprising the step of:
(g) displaying said clipped signal at coordinates on a visual display corresponding to coordinates in the scene.

48. The method of claim 39 wherein said second signal is scaled by a predetermined factor prior to being subtracted in step (e) from said first signal.

49. The method of claim 39 wherein the entire infrared scene in the total field of view of the sensor is scanned by writing a sufficient number of first and second spots sufficiently close and at equally spaced coordinates on said modulator.

50. The method of claim 49 wherein at least one region of the scene is subsequently rescanned by writing additional reflecting spots at said region of the modulator with said spots being smaller than the spots in the original scan and said sampling coordinates being closer together than in said original scan.

51. The method of claim 49 further comprising the step of:
(k) storing each of the filtered signals obtained from each sampling coordinate on the modulator to obtain a picture of the entire scene.

52. The method of claim 39 wherein said first and said second spots are asymmetrically displaced.

* * * * *